(12) United States Patent
Maher

(10) Patent No.: US 7,106,216 B1
(45) Date of Patent: Sep. 12, 2006

(54) RADIO WAVE SYSTEM FOR REPELLING BIRDS FROM AIRCRAFT

(76) Inventor: Thomas P. Maher, 9059 Dixiana Villa Cir., Tampa, FL (US) 33635

( * ) Notice: Subject to any disclaimer, the term of this patent is extended or adjusted under 35 U.S.C. 154(b) by 496 days.

(21) Appl. No.: 10/649,926

(22) Filed: Aug. 26, 2003

(51) Int. Cl.
*G08G 5/04* (2006.01)
(52) U.S. Cl. ............... 340/961; 340/384.2; 342/29; 119/713
(58) Field of Classification Search ............ 340/436
See application file for complete search history.

(56) References Cited

U.S. PATENT DOCUMENTS

| | | | |
|---|---|---|---|
| 6,250,255 B1 * | 6/2001 | Lenhardt et al. ............ | 119/713 |
| 6,804,607 B1 * | 10/2004 | Wood ........................ | 701/301 |
| 6,940,424 B1 * | 9/2005 | Philiben et al. ............. | 340/945 |
| 2003/0090391 A1 * | 5/2003 | Philiben et al. ............. | 340/945 |
| 2005/0145162 A1 * | 7/2005 | Marcus ..................... | 116/22 A |

* cited by examiner

*Primary Examiner*—Daniel Wu
*Assistant Examiner*—George Bugg
(74) *Attorney, Agent, or Firm*—Kenneth L Tolar

(57) ABSTRACT

A radio wave system for repelling birds from aircraft that includes a directional radio wave transmitting rod, a frequency transmitter unit wired to the directional radio wave transmitting rod, and an activation switch in controlling connection with the frequency transmitting unit. The frequency transmitting unit generates and transmits radio wave signals, when the activation switch is in an on position, to the directional radio wave transmitting rod which emits a cone shaped radio wave signal in front of an aircraft. The cone shaped radio signal is emitted at a frequency detected by birds in flight which are deflected onto a flight path which avoids collisions between the birds and the aircraft.

1 Claim, 2 Drawing Sheets

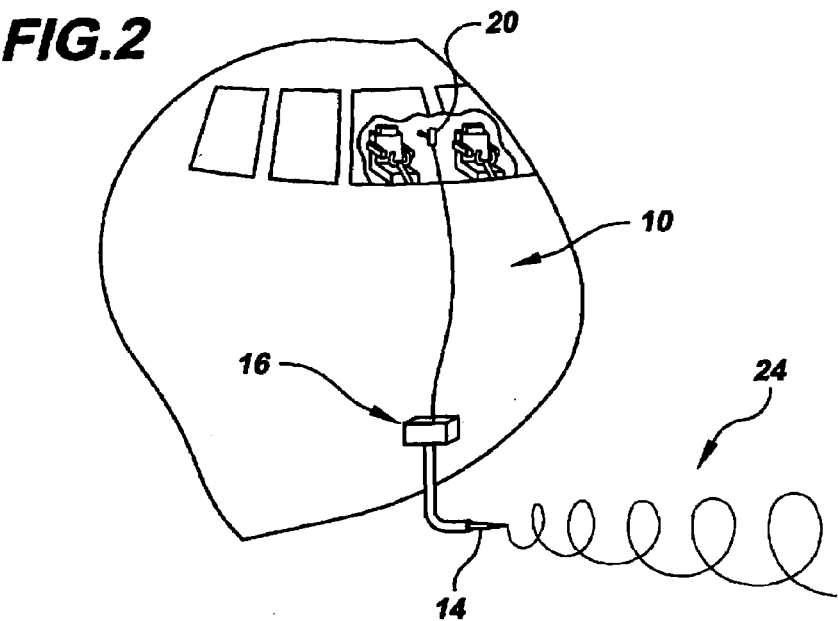
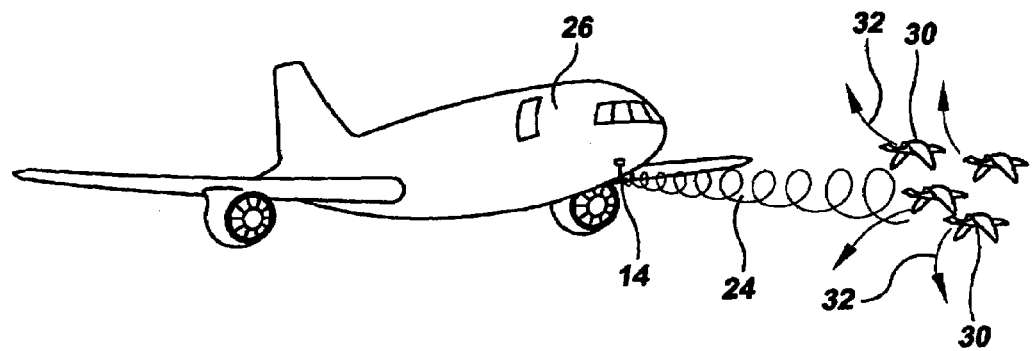

RADIO WAVE SYSTEM FOR REPELLING BIRDS FROM AIRCRAFT

TECHNICAL FIELD

The present invention relates to equipment for keeping birds away from structures and devices, such as radio towers and aircraft engines, which could be harmed when struck by one or more birds and more particularly to a radio wave system for repelling birds from aircraft and for keeping birds away from areas and structures as described above. The radio wave system for repelling birds from aircraft includes a directional radio wave transmitting rod mounted to a forward structure of the aircraft, a radio frequency transmitter unit wired to the directional radio wave transmitting rod, and an activation switch in controlling connection with the frequency transmitter unit; the frequency transmitter unit generating and transmitting radio wave signals, when the activation switch is in an on position, to the directional radio wave transmitting rod which emits a cone shaped radio wave signal in front of the aircraft at a radio frequency selected to be easily detected and known to be avoided by birds in flight in order to deflect the birds onto a flight path away from a collision with the aircraft.

BACKGROUND ART

Collisions between aircraft and birds can result in severe damage to the aircraft. It would be desirable, therefore, to have a system for directing birds in flight onto a flight path away from colliding with the aircraft. Because birds can detect some radio waves, it would be a benefit to have a bird collision avoidance system that included a mechanism for generating a cone shaped radio wave in front of the plane to deflect the flight path of any birds away from the plane such that a collision is avoided between the birds and the aircraft.

GENERAL SUMMARY DISCUSSION OF INVENTION

It is thus an object of the invention to provide a radio wave system for repelling birds from aircraft that includes a directional radio wave transmitting rod mounted to a forward structure of the aircraft, a radio frequency transmitter unit wired to the directional radio wave transmitting rod, and an activation switch in controlling connection with the frequency transmitter unit; the frequency transmitter unit generating and transmitting radio wave signals, when the activation switch is in an on position, to the directional radio wave transmitting rod which emits a cone shaped radio wave signal in front of the aircraft at a radio frequency selected to be easily detected and known to be avoided by birds in flight in order to deflect the birds onto a flight path away from a collision with the aircraft.

Accordingly, a radio wave system for repelling birds from an aircraft is provided. The radio wave system for repelling birds from an aircraft includes a directional radio wave transmitting rod mounted to a forward structure of the aircraft, a radio frequency transmitter unit wired to the directional radio wave transmitting rod, and an activation switch in controlling connection with the frequency transmitter unit; the frequency transmitter unit generating and transmitting radio wave signals, when the activation switch is in an on position, to the directional radio wave transmitting rod which emits a cone shaped radio wave signal in front of the aircraft at a radio frequency selected to be easily detected and known to be avoided by birds in flight in order to deflect the birds onto a flight path away from a collision with the aircraft.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 2 is a partial perspective view of the radio wave system for repelling birds from aircraft installed on the front of a jet airliner.

FIG. 3 is a perspective view of the radio wave system for repelling birds from aircraft with the directional radio wave transmitting rod transmitting radio waves to scatter a flock of birds.

EXEMPLARY MODE FOR CARRYING OUT THE INVENTION

Figure 1:
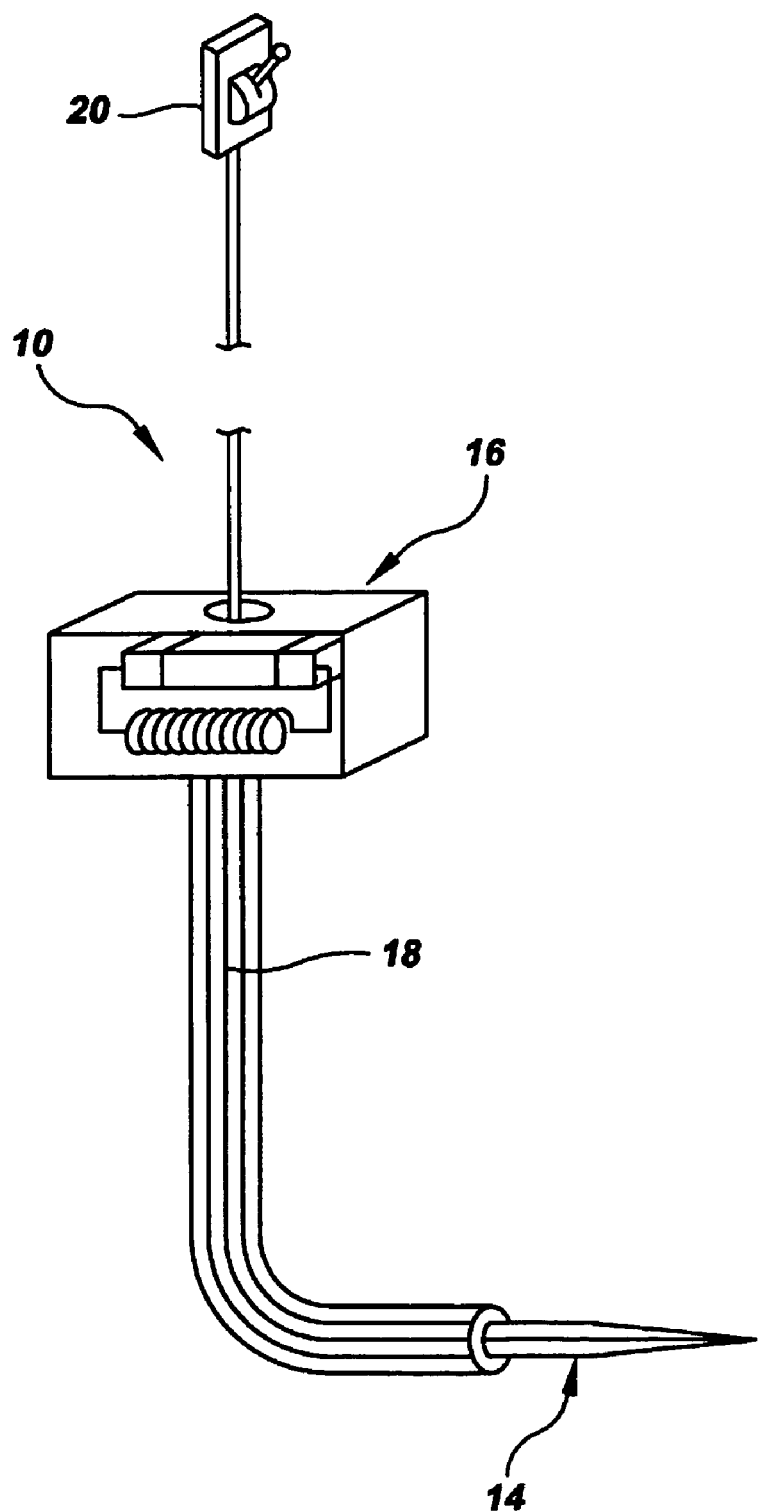
FIG. 1 is a plan view of an exemplary embodiment of the radio wave system for repelling birds from aircraft of the present invention showing the directional radio wave transmitting rod, the frequency transmitter unit wired to the directional radio wave transmitting rod, and an activation switch in controlling connection with the frequency transmitting unit.

FIG. 1 shows various aspects of an exemplary embodiment of the radio wave system for repelling birds from aircraft of the present invention generally designated 10. Radio wave system for repelling birds from aircraft 10 includes a directional radio wave transmitting rod, generally designated 14; a frequency transmitter unit, generally designated 16, wired to the directional radio wave transmitting rod 14 with connecting wires 18; and an activation switch, generally designated 20, having an "on" position and an "off" position that and which is wired in controlling connection with frequency transmitting unit 16. Frequency transmitting unit 16 generates and transmits radio wave signals, when the activation switch is in the "on" position, to directional radio wave transmitting rod 14 which emits a cone shaped radio wave signal 24 in front of an aircraft 26. Cone shaped radio signal 24 is emitted at a frequency detected by birds 30 in flight which are deflected onto a flight path 32 which avoids collisions between the birds 30 and the aircraft 26.

It can be seen from the preceding description that a radio wave system for repelling birds from an aircraft has been provided.

It is noted that the embodiment of the radio wave system for repelling birds from aircraft described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A radio wave system for repelling birds from an aircraft comprising:
   an aircraft;
   a directional radio wave transmitting rod mounted to a forward structure of the aircraft;
   a radio frequency transmitter unit wired to the directional radio wave transmitting rod; and
   an activation switch in controlling connection with the frequency transmitter unit and moveable between an on and an off position;
   the frequency transmitter unit generating and transmitting radio wave signals, when the activation switch is in the on position, to the directional radio wave transmitting rod which emits a cone shaped radio wave signal in front of the aircraft at a radio frequency selected to be easily detected and known to be avoided by birds in flight in order to deflect the birds onto a flight path away from a collision with the aircraft.

* * * * *